June 23, 1970   A. S. RADFORD ET AL   3,516,527
TOKEN CONTROLLED ACCESS-CONTROL EQUIPMENT AND ITEM-DISPENSING
SYSTEMS INCLUDING SUCH EQUIPMENT
Filed March 5, 1968   11 Sheets-Sheet 1

Arthur S. Radford
George T. A. Blakey
Geoffrey E. P. Constable
Graeme E. Cullen
Richard Swarbrick
    Inventors By: Hall, Pollock & Vande Vard
    Attorneys

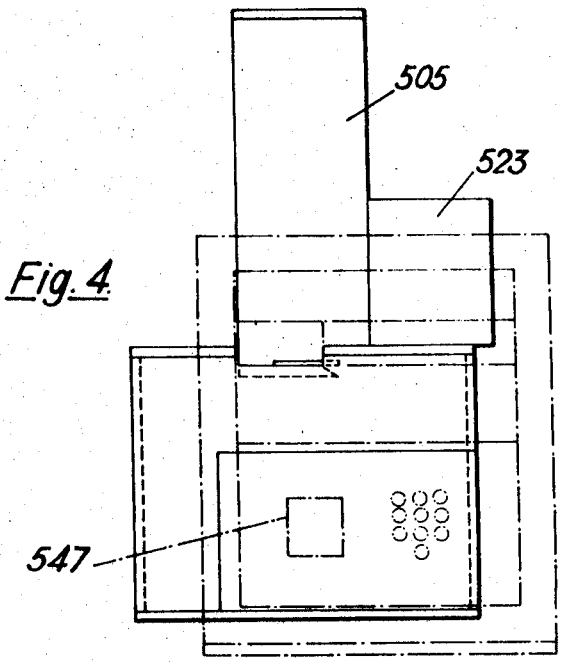
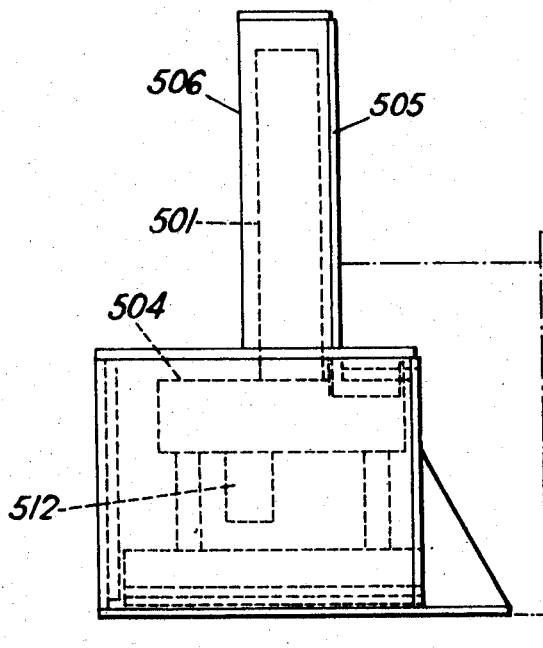

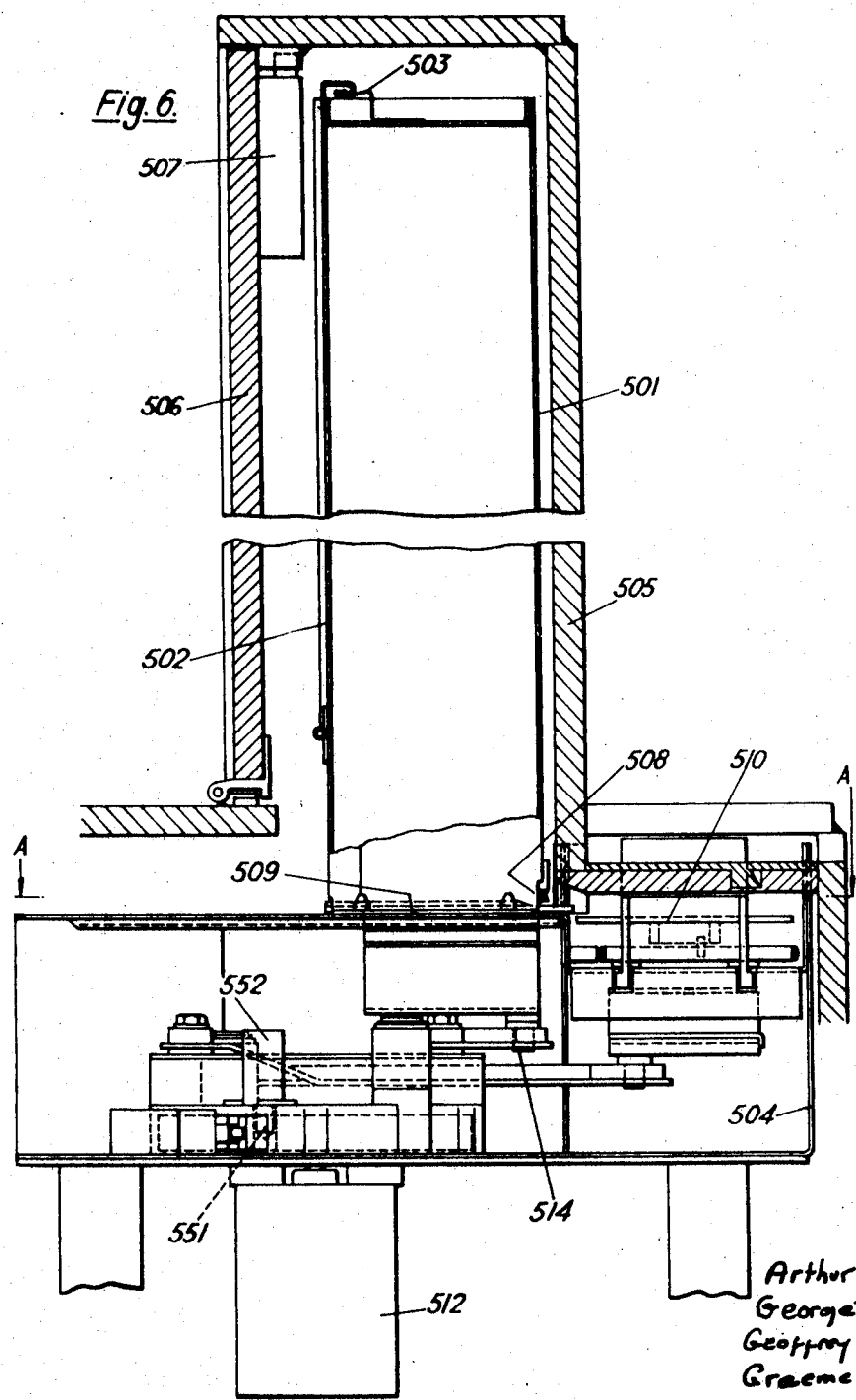

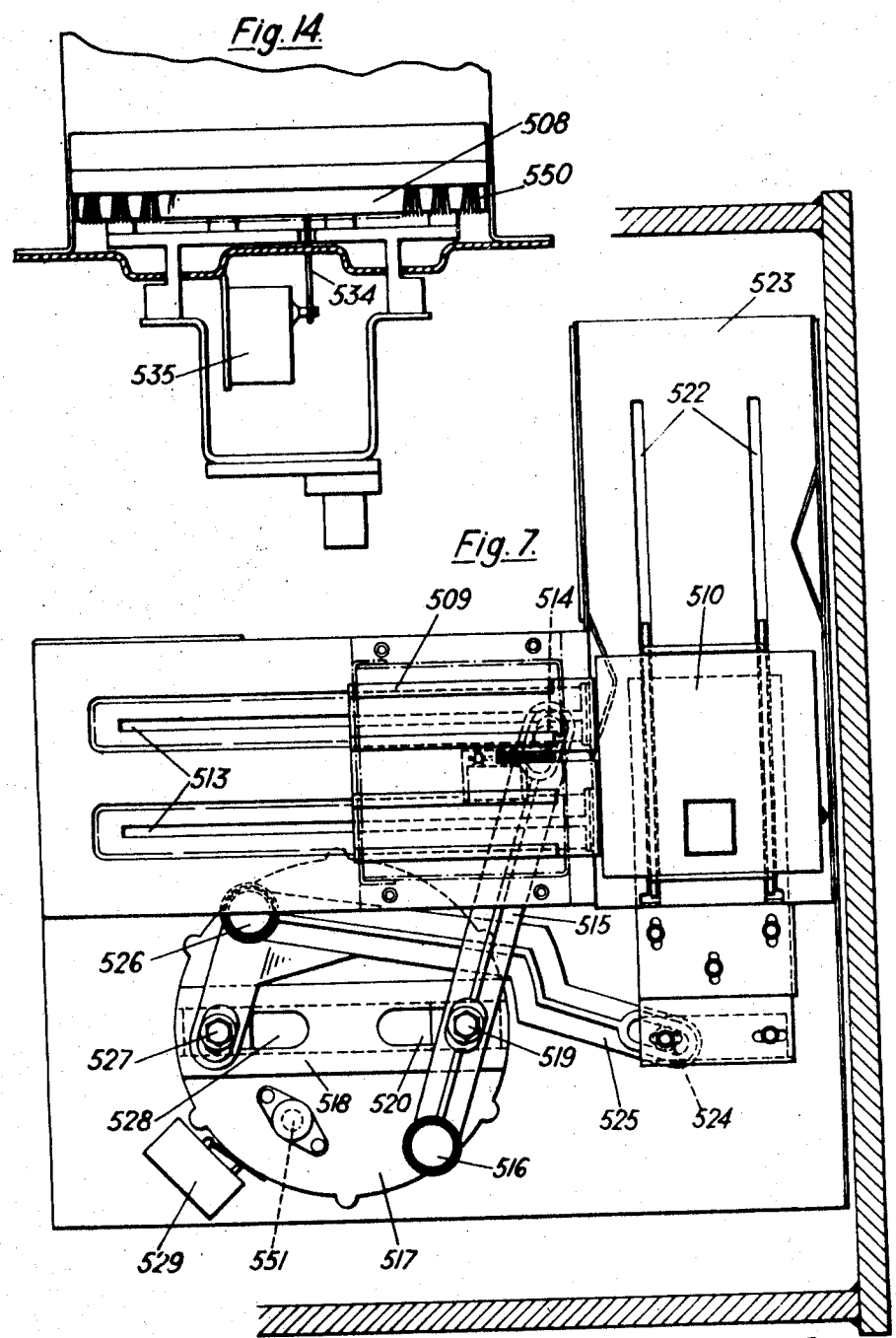

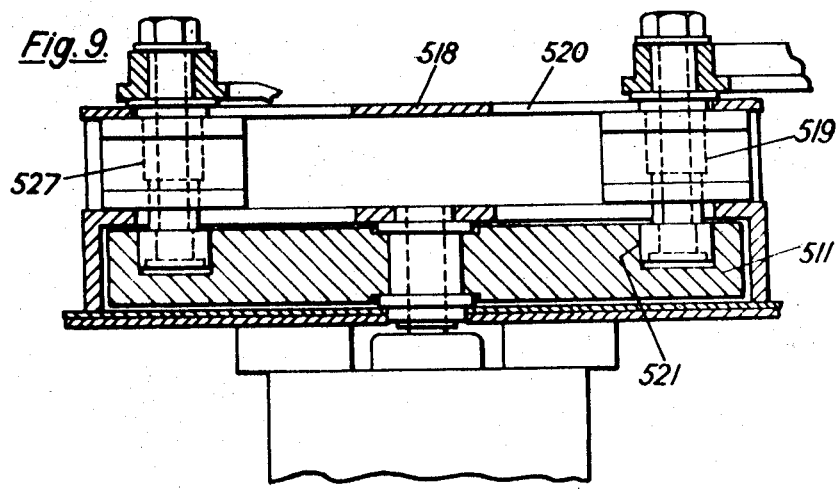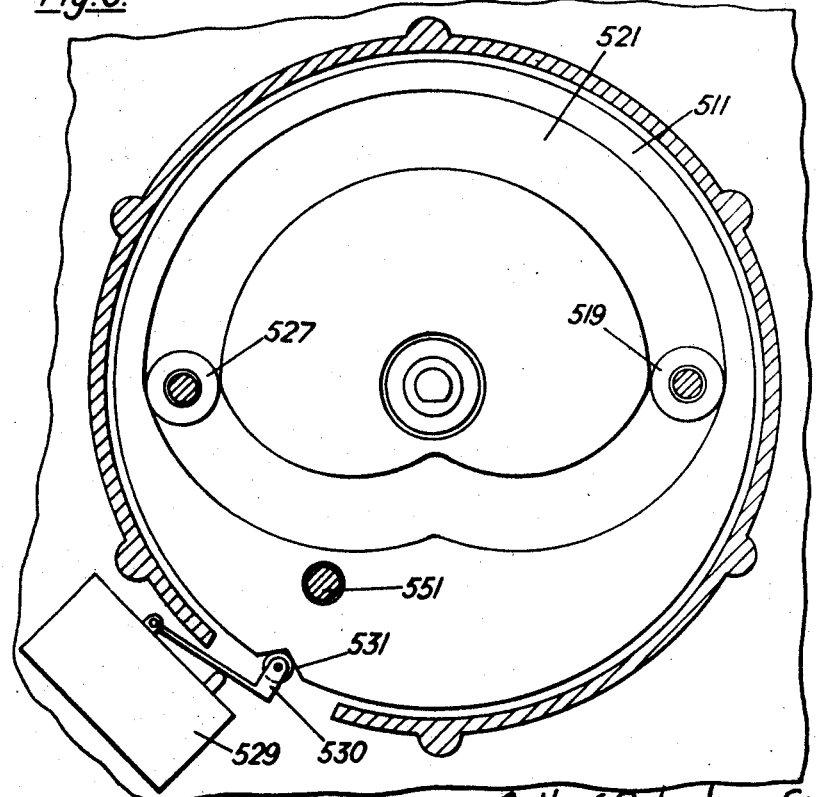

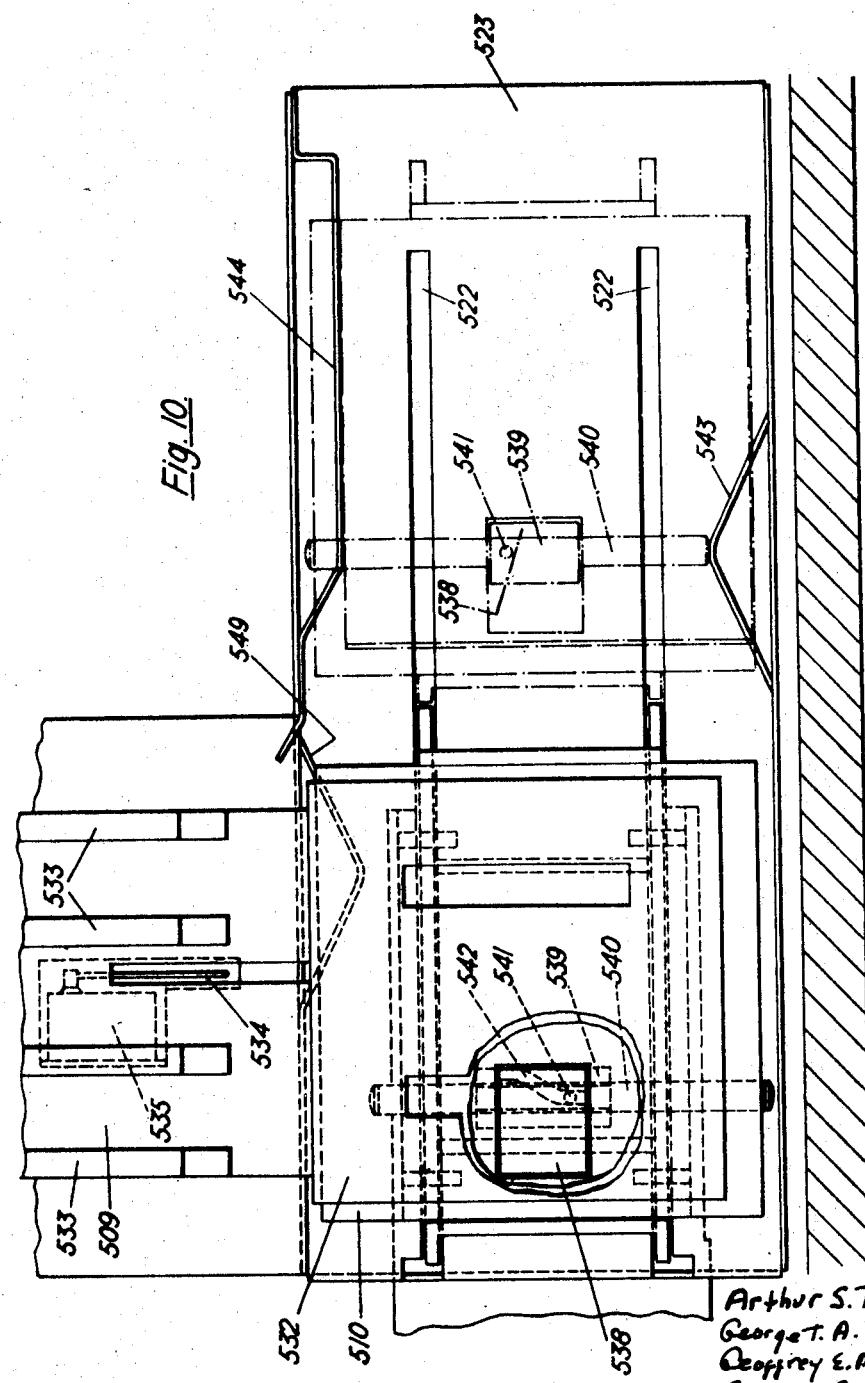

Arthur S. Radford
George T. A. Blakey
Geoffrey E. P. Constable
Graeme C. Cullen
Richard Swarbrick Inventor By Hall, Pollock +
Vande Sande
Attorney

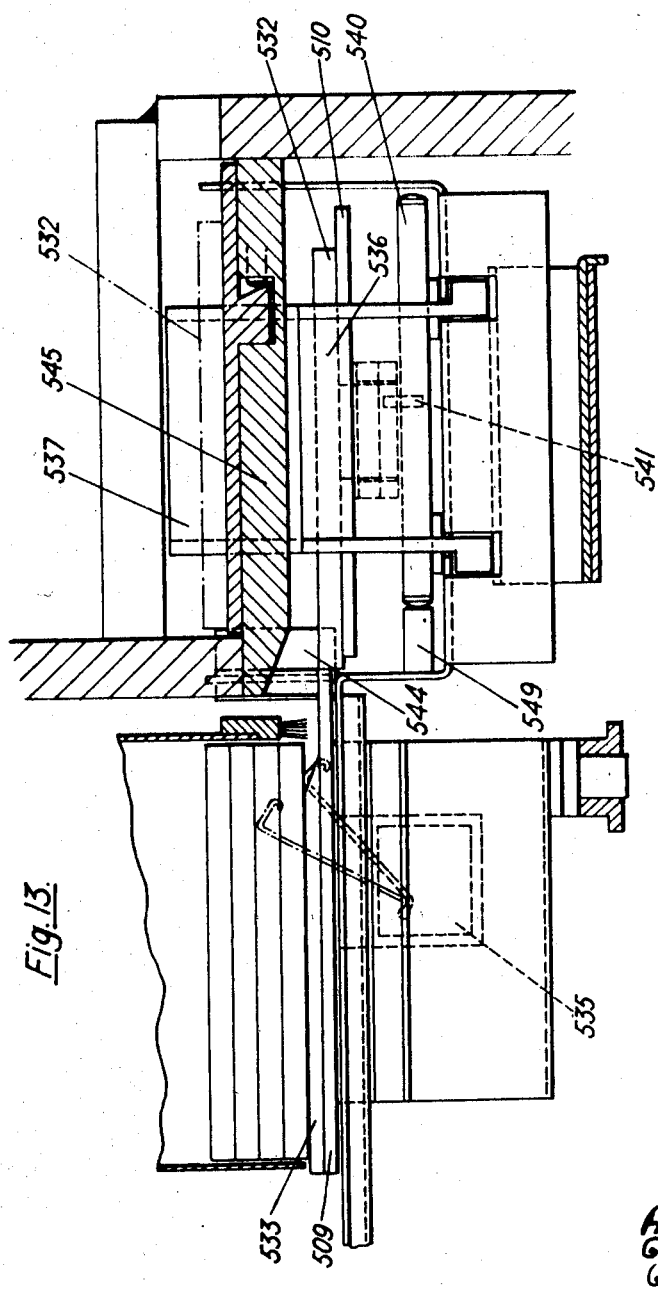

Fig. 15.

Arthur S. Radford
Richard Swarbrick
George T. A. Blakey
Geoffrey E.P. Constable
Graeme E. Cullen Inventor

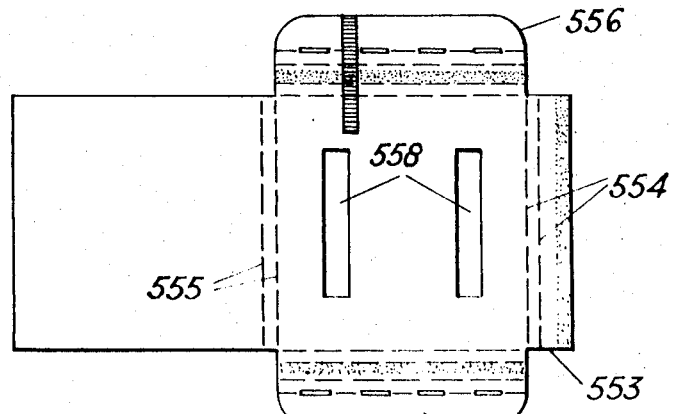
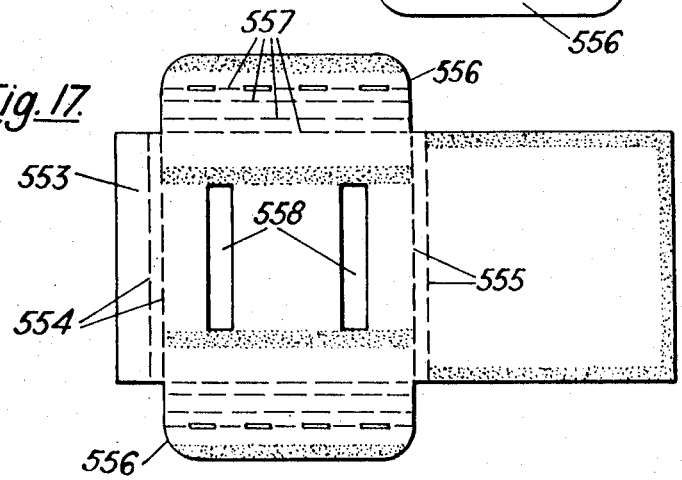
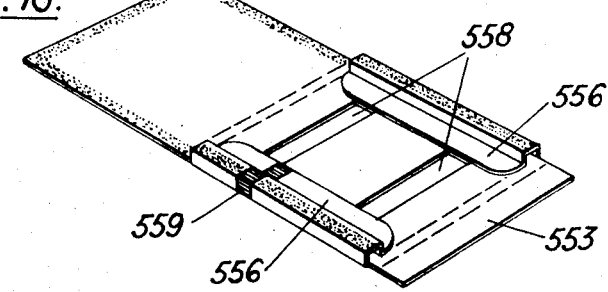
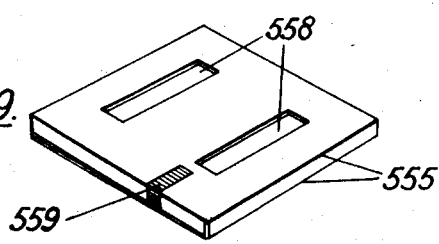

United States Patent Office 3,516,527
Patented June 23, 1970

3,516,527
TOKEN CONTROLLED ACCESS-CONTROL EQUIPMENT AND ITEM-DISPENSING SYSTEMS INCLUDING SUCH EQUIPMENT
Arthur Stanley Radford, Wightwick, near Wolverhampton, George Thomas Allan Blakey, Shifnal, and Geoffrey Ernest Patrick Constable, Cheltenham, England, and Graeme E. Cullen, Castle Douglas, and Richard Swarbrick, Glasgow, Scotland, assignors of fifty percent to Chubb & Son's Lock and Safe Company Limited, fifty percent to Smiths Industries Limited, both of London, England, both British companies
Filed Mar. 5, 1968, Ser. No. 710,459
Claims priority, application Great Britain, Mar. 6, 1967, 10,536/67
Int. Cl. G07f 1/06
U.S. Cl. 194—4
17 Claims

ABSTRACT OF THE DISCLOSURE

A money-dispensing system is operative to dispense money in response to a bank-customer's punched-card admitted to the equipment, and keyed-entry of his personal-identification number, admission of the card to the equipment being barred unless it has a predetermined hole-distribution along a leading edge. A package of money is dispensed along a circuitous path from a reserve-container only if the admitted card satisfies a magnetic authenticity-check and the key-entered number is correlated to the encoding on the card.

---

This invention relates to access-control equipment and item-dispensing systems including such equipment.

The invention is especially concerned with access-control equipment of the kind that selectively enables access to a facility, under control of a coded token. The coded token may, for example, be in the form of a punched card, each person authorized to make use of the facility being issued with such a card for presentation to the equipment when access is required.

According to one aspect of the present invention, access-control equipment for selectively enabling access to a facility comprises first means for receiving at least a part of a coded token presented to the equipment and for admitting the token further to the equipment only in the event that said part has a predetermined characteristic, said characteristic being a characteristic indicative, at least partly, of authenticity of the token, second means for receiving any token admitted as aforesaid to read from the admitted token information encoded thereon, third means that is selectively operable to enable access to said facility, and fourth means for operating said third means in dependence upon the information read from said token.

The said part of the coded token may be located at a margin of the token (for example, at one end of an elongated rectangular token), the said first means being arranged to receive initially just this marginal part of the token and to admit the token further to the equipment only in the event that the marginal part has said predetermined characterisitcs. The predetermined characteristic in this respect, may be provided by holes punched through the marginal part of the token with a predetermined spatial distribution.

The equipment may include means that is operable manually for entering into the equipment a plural-character word, the particular word entered being dependent upon manual selection, and in these circumstances it may be arranged that said third means is operable only in the event that there is a predetermined correspondence between the said information read from the token and the said word entered into the equipment manually. The encoded information read from the token may relate to the identity of the particular person to whom the token has been issued, and in these circumstances said predetermined corrspondence may be arranged to exist, and access to said facility may be enabled, only if such person is also identified by the plural-character word entered manually into the equipment. This arrangement has the advantage of increased security over certain prior access-control equipment (for which presentation of an appropriately-encoded token is normally all that is required in order to gain access to the relevant facility) since the gaining of access in these circumstances is conditional not only upon the presentation to the equipment of an appropriately-encoded token, but also upon manual entry of the corresponding plural-character word. The plural-character word may be, at least in part, numerical, and in these circumstances the means for entering this word manually may include ten keys (for example, push-buttons) numbered 0 to 9 that are operable one at a time to enter the digits of the relevant number in ordered sequence. As an alternative, such means may include a dial mechanism comparable to a telephone dial, the relevant digits (and where applicable, other characters) being entered, in order by sequential dialling operations.

The access-control equipment may be arranged to enable selectively, access to any form of facility, for example, entry to a restricted area, use of a service, or withdrawal of an item or product (in predetermined or selected quantity). One particular application of the equipment is in the field of banking where money-dispensing systems are provided for use by customers at all times, the customers being issued with individual coded-tokens for presentation to any one of the dispensing systems when withdrawal of money is required. More generally, and in accordance with another aspect of the present invention, the access-control equipment may be included in an item-dispensing system to control actuation of dispenser equipment, the dispenser equipment being arranged to dispense from a reserve of items (for example, individual bank-notes or packages of bank-notes) one such item only when released to do so by the access-control equipment, and said access-control equipment being arranged to release the dispenser equipment in this manner only in response to a valid "request" involving, at least, the presentation and admission to the access-control equipment of an authentic token.

An item dispensing system in accordance with the present invention will now be described, by way of example, with reference to the accompanying drawings, in which:

FIGS. 4 and 5 represent respectively in front and side elevation a package-dispenser used in the item-dispensing system;

FIG. 6 represents in enlarged side sectional view the dispenser shown in FIG. 4;

FIG. 7 represents a sectional plan view in the plane A—A of FIG. 6;

FIG. 8 represents in enlarged plan the cam of FIGS. 6 and 7;

FIG. 9 represents a transverse diametrical section of the cam shown in FIG. 8;

FIG. 10 represents an enlarged plan view of a runway shown in FIG. 7;

FIGS. 11 to 13 represent in side sectional elevation the mechanism of the dispenser in successive operational stages when delivering a package;

FIG. 14 represents a front elevation in the direction of arrows B—B in FIG. 11;

FIG. 15 represents in front part-sectional elevation (that is, in a plane at right angles to that of FIGS. 11 to 13) the mechanism of the dispenser performing final stages of delivery of a package;

FIGS. 16 and 17 represent opposite faces of a blank for forming a carton for packaging bank-notes for use in the dispenser shown in FIGS. 4 to 15; and FIGS. 18 and 19 represent in perspective a partly-folded carton blank and a completed package respectively.

The system to be described is for use in dispensing packets of bank-notes, one at a time, to customers of a bank, and is for installation at a branch of the bank to be accessible after, as well as during, normal banking hours. The customers authorized to use the system are each issued with one or more coded tokens in the form of plastic cards punched with holes. Each card carries numerical information identifying the customer to whom the card has been issued, such information being encoded on the card by the presence and absence of holes in predetermined positions on the card. The customer is informed of his personal-identification number, but the encoding of this number on the card is such that it cannot be readily deducted from the punched-card itself. When the customer wishes to withdraw a packet of bank-notes, he simply presents his punched-card to a card-reception unit of the system and operates a set of ten push-buttons in accordance with his personal-identification number. The system retains the card and in return automatically dispenses to the customer one packet of bank-notes. The packet of bank-notes is dispensed to the customer from a dispenser that holds a supply of such packets, the dispenser being released to dispense the packet only after the validity of the transaction has been checked. In this latter respect the system checks the authenticity of the card and then that the number inserted manually by the customer is the same as the personal-identification number encoded on the card.

Figure 1:
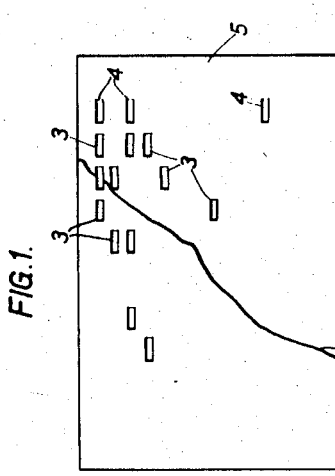
FIG. 1 shows the form of a coded token used with the item-dispensing system.

Referring to FIG. 1, each card is formed by a rectangular substrate 1 of opaque plastic material that carries a magnetic coating 2 on its obverse face (the coating may be sandwiched between two plastics sheets). In addition to holes 3 punched through the card to encode the appropriate personal-identification number, there is a set of three holes 4 that are punched through the card at spaced intervals from one another across the width at one end 5. The magnetic coating 2 involves two magnetic oxides of high- and low-coercivity respectively, the magnetic oxides being provided either in separate layers, with the layer of high-coercivity material extending in a band across the width of the substrate 1 beneath the other layer, or as an admixture of the two materials. A series of pulses is recorded in the high-coercivity material, the individual pulse-recordings being made at positions within the coating 2 spaced from one another lengthwise of the card. For security purposes, the low-coercivity material carries a magnetic recording that extends over substantially the whole area of the coating 2 and serves to provide "noise" masking the pulse-recordings from easy detection.

The authenticity of each card presented to the system is checked, firstly by detecting whether the card has appropriately-located holes 4, and then by detecting whether it carries an appropriate series of pulse-recordings in the coating 2. These checks are performed by the card-reception unit represented in FIG. 2.

Figure 2:
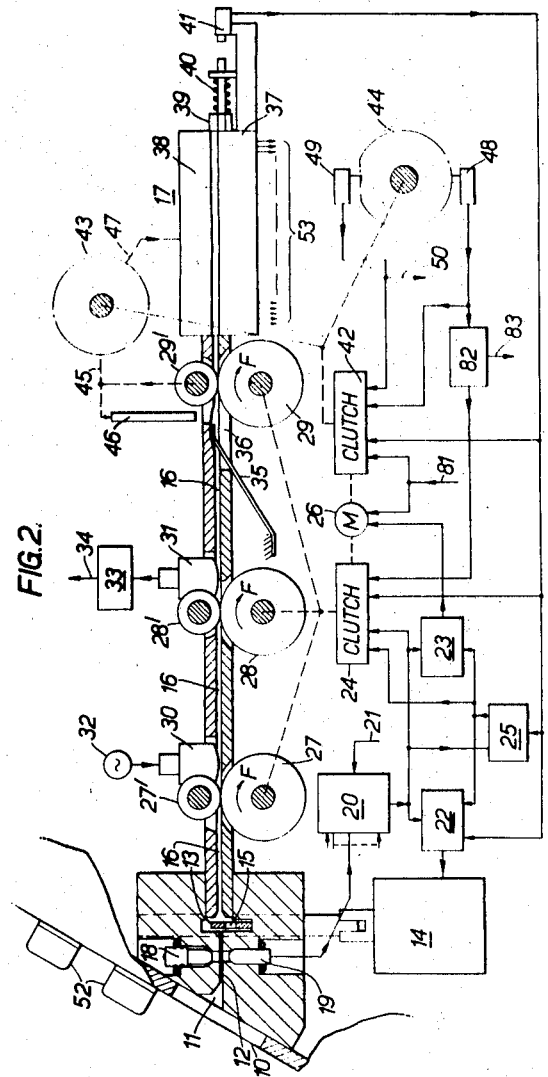
FIG. 2 is a schematic representation of part of the item-dispensing system used for receiving and selectively admitting coded tokens to the system.

Referring to FIG. 2, the card-reception unit has a facia 10 that is mounted in an external wall of the bank, and has a readily-accessible mouth 11 for receiving the customer's card. The mouth 11 within the unit converges to a throat-portion 12 that is normally blocked at its far end by a movable shutter 13. An electrical solenoid 14 controls the shutter 13, the solenoid 14 when energized moving the shutter 13 upwardly against a spring-bias to bring a gate-aperture 15 through the shutter 13, into alignment with the throat-portion 12. This opens the way for the card to pass through the portion 12 into a guideway 16 that leads to a card-reader 17. The shutter 13 remains in this open position only so long as the solenoid 14 is energized, and is otherwise returned and held by the spring-bias in the closed position in which the way into the guideway 16 is blocked.

The customer presents his card to the card-reception unit by inserting the end 5 into the exposed mouth 11 with the coating 2 uppermost. The end 5 is inserted through the mouth 11 into the throat-portion 12 to abut the closed shutter 13. In this position of the card, the set of holes 4 lie beneath lamps 18 (of which only one is shown) that are continuously energized to direct light downwardly across the throat-portion 12 towards individual photoelectric cells 19. The photoelectric cells 19 (of which only one is shown) are disposed at spaced intervals from one another across the width of the throat-portion 12, and, until a card is inserted in the throat-portion 12, each cell 19 receives light from its associated lamp 18 and in response thereto supplies an electric signal to an electrical gating unit 20.

The unit 20 is responsive only to the condition in which signals are supplied by a certain combination of three of the photoelectric cells 19 and not by the remainder. This condition exists only when a card with the corresponding number of appropriately-located holes 4 is presented to the card-reception unit with the end 5 leading and with the coating 2 uppermost, light passing to the three cells 19 through the holes 4, and being obstructed in its passage to the remainder by the absence of holes 4 elsewhere across the width. Response of the gating unit 20 to this condition is, however, effective to produce an output signal from the unit 20 only in the circumstances in which an enabling signal is present on a lead 21 from the dispenser (not shown in FIG. 2) of the system. The dispenser supplies the enabling signal to the lead 21 only so long as there is still a packet of bank-notes available in the dispenser. If no enabling signal is present on the lead 21, there is no output signal from the unit 20, and an EMPTY sign (not shown) on the facia 10 of the card-reception unit is illuminated. The EMPTY sign is illuminated (by means not shown) throughout any period for which the enabling signal is absent from the lead 21, so as to warn customers that the system is not operative. The absence of the enabling signal at the unit 20 has the effect of inhibiting operation, since the system is then incapable of responding even when presented with an authentic card.

When there is response of the unit 20 in the presence of the enabling signal on the lead 21, the output signal supplied by the unit 20 is passed to switch ON a switch unit 22 that controls the supply of electrical energization current to the solenoid 14. The output signal is also supplied to switch ON a switch unit 23, to engage a clutch 24, and to start operation of a timer 25. The switch unit 23 controls the supply of electrical energization current to a reversible electric motor 26, the motor 26 being coupled through the clutch 24 to drive three card-transport rollers 27 to 29 that project into the guideway 16 at spaced intervals therealong. The switching ON of the units 22 and 23 serves to energize both the solenoid 14 and motor 26, with the result that the shutter 13 moves upwardly to admit the card through the gate-aperture 15 into the guideway 16, and the rollers 27 to 29 rotate in their forward senses indicated by the arrows F. The card admitted through the gate-aperture 15 is fed by the customer into the guideway 16 until the leading end 5 reaches the rotating roller 27. An idling roller 27' is urged resiliently and downwardly into contact with the roller 27 so that when the end 5 reaches the roller 27 the card is drawn lengthwise completely into the card-reception unit. The card is drawn in between the rollers 27 and 27' to be fed along the guideway 16 towards the rotating roller 28. The end 5 eventually enters between the roller 28 and an associated idling roller 28' that is urged resiliently and downwardly into contact with the roller 28. The card is accordingly drawn lengthwise from the rollers 27 and 27' and is passed further on along the guideway 16 towards the rotating roller 29 positioned at the entrance to the card-reader 17.

The card, in its passage along the guideway 16 from the roller 27 to the roller 28 and thence from the roller 28 towards the roller 29, passes successively beneath a magnetic-recording head 30 and a magnetic-reading head 31. The head 30, which projects into the guideway 16 adjacent the roller 27, is energized with alternating current that is supplied from a source 32 to erase the "noise" which in an authentic card is recorded over the pulse-recordings in the coating 2. The frequency and amplitude of this alternating current are so chosen that the magnetic flux produced by the head 30 is well capable of erasing the "noise" recorded in the low-coercivity material, but is nonetheless insufficient to affect the pulse-recordings recorded in the high-coercivity material.

The erasure of the "noise" masking the pulse-recordings enables these recordings to be read from the coating 2 by the head 31. The head 31 projects into the guideway 16 adjacent the rollers 28, and as the card is fed lengthwise from between the rollers 28 and 28', so the pulse-recordings of the authentic card are sensed in turn by the head 31. The sensed pulse-recordings give rise to a series of pulse signals from the head 31, and these pulse signals are passed from the head 31 to a code-recognition unit 33 where they are counted. The unit 33 detects whether the number of pulse signals counted is the same as the number of pulse-recordings provided on each authentic card, and then only if it is, provides on a lead 34 an output signal indicative of this fact. This output signal, the existence of which (as explained later) is an essential for release of the dispenser to dispense a packet of bank-notes, persists after the card has passed onto the roller 29 and until the unit 33 is eventually reset.

The card in being driven by the roller 28 from the head 31 towards the roller 29, strikes a leaf-spring 35 that projects upwardly through a slotted opening 36 in the bottom of the guideway 16. The leaf-spring 35 is sprung to incline forwardly across the path of the card and so as to be deflected downwardly by the card in passage of the card along the guideway 16 to the roller 29, the deflected spring 35 effectively blocking entry to the opening 36. At the roller 29 the leading end 5 of the card is drawn in between the rotating roller 29 and an associated idling roller 29' that is urged resiliently and downwardly into contact with the roller 29. The card is accordingly drawn lengthwise through the rollers 29 and 29' so as to pass into the card-reader 17. From the roller 29 the card passes onto a bed 37, and beneath a head 38, of the card-reader 17. The card is driven by the roller 29 so that the end 5 passes along the full length of the bed 37 to strike a plunger 39 located at the far end of the bed 37. The drive provided on the card by the holler 29 urges the plunger 39 backwardly against a spring 40 to actuate a switch 41.

Actuation of the switch 41 causes an electric signal to be supplied from the switch 41 to switch OFF the unit 22 and to terminate operation of the timer 25. The switching OFF of the unit 22 breaks the supply of energization current to the solenoid 14 with the result that the shutter 13 closes. The timer 25 is arranged to supply a signal to the unit 22 to have the same effect as this, in the event that a pre-set period of operation of the timer 25 expires before receipt of the signal from the switch 41. In this latter respect, the timer 25 is pre-set to run for a period adequate to allow the card to be transported along the guideway 16 into the card-reader 17. Operation of the timer 25 to run for this period is started, as referred to above, by the output signal from the gating unit 20 immediately preceding admission of the card to the guideway 16. If within this period there is no signal from the switch 41 (that is to say, if there is no signal to signify that the card has entered the card-reader 17), then the timer 25 supplies an output signal that has the effect of inhibiting further operation of the system. This output signal from the timer 25, as well as being supplied to the unit 22 to result in closure of the shutter 13, is supplied to disengage the clutch 24, and also to switch OFF the unit 23 and thereby break energization of the motor 26. The operation of the timer 25 to produce this output signal is inhibited however, when in the normal course of events there is actuation of the switch 41 before expiry of the pre-set period.

The signal supplied to the timer 25 and unit 22 upon actuation of the switch 41, is also supplied to disengage the clutch 24 and to engage a second clutch 42. Disengagement of the clutch 24 breaks drive from the motor 26 to the rollers 27 to 29, so that once the switch 41 is actuated drive to the card ceases. The card is restrained from movement in these circumstances by virtue of the pressure of the roller 29' holding it against the stationary roller 29.

Engagement of the second clutch 42 couples drive from the motor 26 to rotate two cams 43 and 44. Rotation of the cam 43 acts via a mechanical connections 45 to depress a stop 46 into the guideway 16 behind the roller 29', and following this to raise the roller 29' from the card. The raising of the roller 29' releases the pressure holding the card on the roller 29, and thereby allows the spring 40, acting via the plunger 39, to urge the card backwardly through the card-reader 17 until it abuts the depressed stop 46. Rotation of the cam 43 also acts via a mechanical connection 47 to lower the head 38 towards the bed 37. Final closure of the card-reader 17, with the card held firmly between the head 38 and bed 37, takes place with sufficient interval after the raising of the roller 29' to allow the card to have moved backwardly to abut the stop 46. In this position the card is correctly located in the card-reader 17 for reading.

Figure 3:
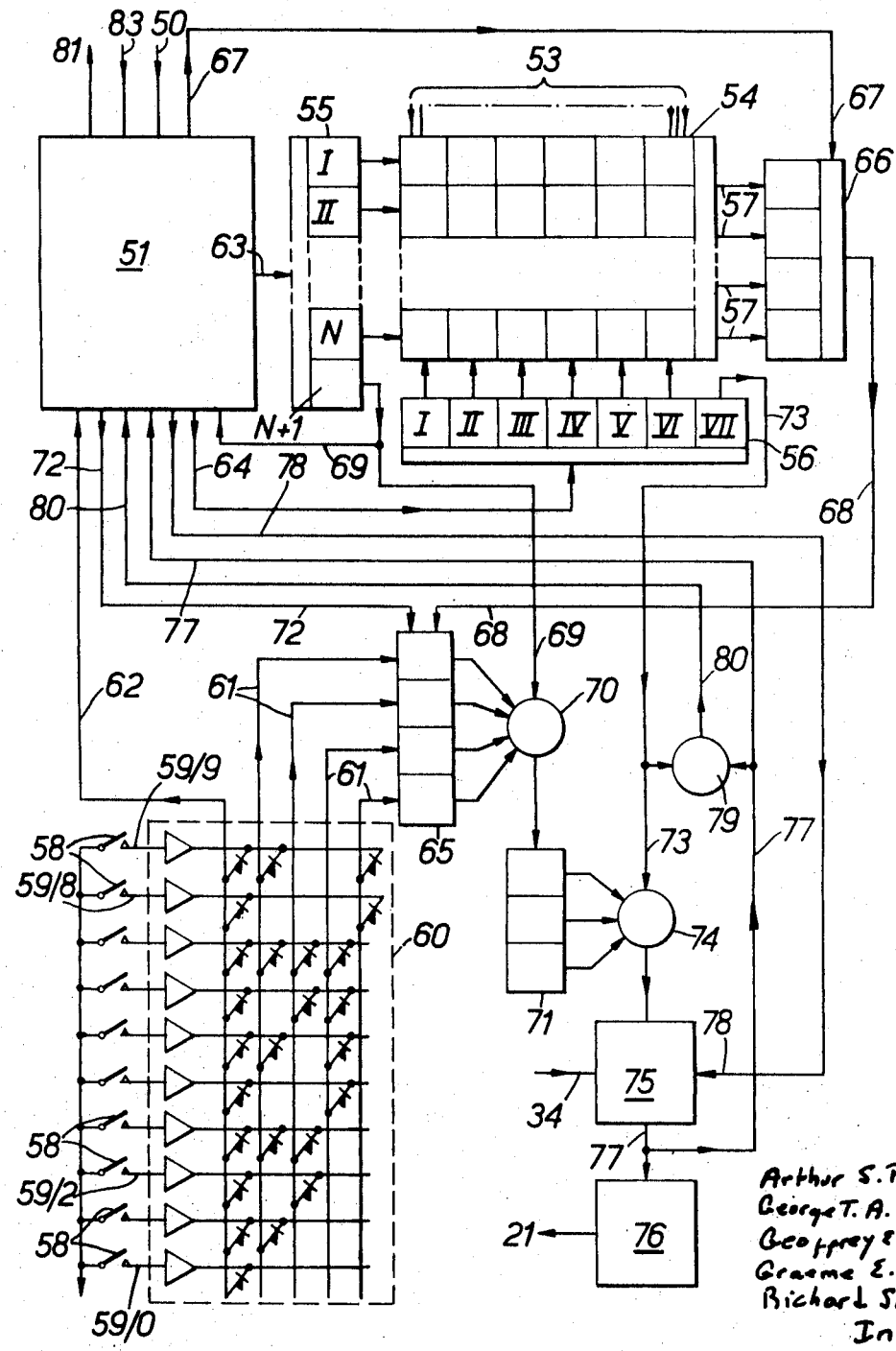
FIG. 3 is a schematic representation of electronic circuits forming part of the item-dispensing system and used in conjunction with the arrangement of FIG. 2.

The cam 44, driven with the cam 43 through the clutch 42, rotates through an angular range of one-hundred-and-eighty degrees as the card-reader 17 is closed. Two electrical switches 48 and 49 are associated with the cam 44, the switch 48 to be actuated while the cam 44 is positioned at the beginning of this angular range, and the switch 49 to be actuated at the end of the range. Actuation of the switch 49 is indicative of the condition in which the card-reader 17 is fully closed, whereas actuation of the switch 48 is taken as being indicative of the condition in which the card-reader 17 is open. The switch 49 while actuated by the cam 44, supplies an electric signal to the clutch 42 and, via a lead 50, to a programming unit 51 (FIG. 3). The application to the clutch 42 of the leading edge of this signal is effective to disengage the clutch 42 and thereby arrest further rotation of the cams 43 and 44. In the programming unit 51, the signal is effective to start operation of a timer (not shown), to cause illumination of a second sign (not shown) on the facia 10, and to provide a signal signifying that that the card is in position in the card-reader 17, the existence of this latter signal being (as explained later) an essential for release of the dispenser to dispense a packet of bank-notes. The second sign of the facia 10 signifies ENTER PERSONAL-IDENTIFICATION NUMBER, and illumination of this directs the customer to enter his appropriate personal-identification number using a set of ten push-buttons 52 (only two of which are shown) mounted in four rows on the facia 10.

The personal-identification number is in each case a decimal number of six digits. The ten push-buttons 52 are accordingly numbered with the ten decimal digits 0 to 9 respectively, the six digits of the number being entered in order operating one push-button 52 at a time. The six-digit number entered in this way is compared in the system with the six-digit personal-identification number encoded on the card, the comparison process being carried out digit-by-digit. In this latter respect, however, the encoding of the personal-identification number on the card involves N decimal numbers, each of six digits (where N is an integer larger than unity). The sum of these N numbers taken without carry, constitutes the relevant personal-identification number, (N−1) of these constituent numbers being chosen by a random selection process and the other being chosen to give the required sum. The N constituent numbers are represented on the card in a binary-coded-decimal notation by the presence and absence of holes 3, the positions on the card accorded to the binary digits of the different N numbers being intermingled with one another according to a predetermined pattern. This reduces the risk of the personal-identification number encoded on the card being deduced from the card alone or from comparison with other cards.

In the present system the personal-identification number is decoded from the card by an arithmetical operation which involves effectively the addition together of the N binary-coded decimal numbers taking one decimal place at a time and without effecting any carry from the relevant place to the next of higher significance. The values of the decimal digits of the N numbers are read from the card in binary-coded-decimal notation by the card-reader 17. The card-reader 17 when closed upon the card, automatically supplies signals on leads 53 in accordance with these values. The manner in which these signals are used in the system will now be described with reference to FIG. 3.

Referring to FIG. 3, the signals on the leads 53 from the card-reader 17 are applied to a selector unit 54. Each decimal digit read from the card is represented, according to the binary-coded-decimal notation, by the signals appearing on an individual group of four of the leads 53, there being in all 6 N separate groups of four leads 53. The selector unit 54 is operated under the control of two sequencing units 55 and 56 to select the 6 N groups of leads 53 in turn, and to apply the signals on the four leads 53 of the selected group, to four output leads 57 respectively. The sequencing units 55 and 56 are each formed by bistable stages connected in cascade, the unit 55 having (N+1) stages I to (N+ 1), and the unit 56 seven stage I to VII. Each bistable stage has an ON, and an OFF, state, but at any one time only one stage in each unit 55 and 56 is in the ON state. Initially, before the customer depresses any of the push-buttons 52, it is the stage (N+1) of the unit 55, and the stage VII of the unit 56, that are in the ON state.

The ten push-buttons 52 marked 0 to 9, control via ten individual switches 58 the energization of ten input leads 59/0 to 59/9 respectively of a coding matrix 60. Depression of any one of the push-buttons 52, with the consequent actuation of the associated switch 58, energizes the appropriate one of the leads 59/0 to 59/9 to signal to the matrix 60 the value of the decimal digit entered by the customer. The coding matrix 60 in response to this supplies to four output leads 61 pulse signals that together signify the value of this digit according to binary-coded-decimal notation. The matrix 60 in each case also supplies to a fifth output lead 62, and thence to the programming unit 51, a pulse signal signifying that a digit has been entered. The programming unit 51 is responsive to this latter pulse signal in the presence of the signal on the lead 50, to supply a triggering pulse via leads 63 and 64 to the units 55 and 56 respectively.

When, therefore, the customer responds to the illuminated sign ENTER PERSONAL-IDENTIFICATION NUMBER, by depressing the push-button 52 appropriate to the first digit of his personal-identification number, pulse signals signifying the value of this digit appear on the output leads 61 of the matrix 60. These pulse signals are applied from the leads 61 to a register 65 to effect therein temporary storage of the relevant value in binary-coded-decimal notation. The pulse signal that also appears on the output lead 62 of the matrix 60, on the other hand, results in the application of a triggering pulse to the sequencing units 55 and 56 via the leads 63 and 64. Each unit 55 and 56 is responsive to this first triggering pulse to adopt the condition in which its stage I is in the ON state and all its other stages are in the OFF state. In these circumstances, signals representative of the first digit of a first of the N constituent numbers that are read from the card in the card-reader 17, appear on the output leads 57 of the selector unit 54. These signals are applied to a register 66 to effect therein temporary storage of the relevant value in binary-coded-decimal notation.

The register 66 receives via a lead 67 a train of regularly-recurring pulses supplied from the programming unit 51, and these pulses are used therein to count down to zero the value stored. Until the content of the register 66 reaches zero, the pulses supplied via the lead 67 are gated from the register 66 to a lead 68. The pulses appearing on the lead 68 are accordingly in number equal to the first decimal digit of the first constituent number read from the card. These pulses are passed via the lead 68 to the register 65 where they each reduce by unity the content of the register 65. Thus in the register 65 there is substracted from the value of the first decimal digit entered by the customer, the value (stored by the register 66) of the first decimal digit of the first of the N constituent numbers that are read from the card. The subtraction process here is carried out as the equivalent of the addition to the content of the register 65 (in the scale of ten and without carry of the tens-complement of the value stored by the register 66.

The programming unit 51, after it has supplied to the lead 67 a number of pulses sufficient to ensure positively that the register 66 has been counted down to zero (for example, after some sixteen pulses have been supplied), supplies another triggering pulse to the unit 55 (but not to the unit 56) via the lead 63. This triggering pulse switches stage I of the unit 55 to the OFF state and stage II to the ON state. In these circumstances signals that are representative of the value of the first digit of a second of the N constituent numbers read from the card, appear on the leads 57 to result in temporary storage of this value in binary-coded-decimal notation, in the register 66. As before, pulses supplied to the register 66 via the lead 67 are gated to the lead 68 until the content of the register 66 is counted down to zero. The pulses gated to the lead 68, being in number equal to the value of the first digit of the second constituent number, effect the subtraction of this value from the content of the register 65.

The programming unit 51 again supplies a triggering pulse via the lead 63 to step the unit 55 on to the condition in which the next stage, stage III, is in the ON state. As a result, signals that are representative of the first digit of a third constituent number read from the card, appear on the lead 57 to effect temporary storage of this digit in the register 66. The pulses gated to the lead 68 in counting down to zero the content of the register 66, accordingly subtract the value of this digit from the content of the register 65.

The above process of subtracting the value of the first digit of a constituent number from the content of the register 65 is carried out in turn for all the N constituent numbers on the card, the stages I to N of the unit 55 being switched to the ON state successively. After the value of the first digit of the last, Nth, constituent number has been subtracted from the content of the register 65, the programming unit 51 again applies a triggering pulse to the unit 55 and this resets the unit 55 to its initial condition in which stage (N+1) is in the ON state. The switching of stage (N+1) to the ON state causes a pulse to be supplied from the unit 55 and via a lead 69 to a gate 70 associated with the register 65. The gate 70 is responsive to the state of the register 65 to pass this pulse on to a counter 71 only in the event that the value stored in the register 65 at this time is zero. Clearly, the number stored is zero only if the sum without carry, of the first digits of the N constituent numbers read from the card, is the same as the digit entered by the customer. There is no entry in the counter 71 in the event that this equality does not exist, since in these circumstances the value stored in the register 65 is not zero.

The pulse supplied from the unit 55 on the lead 69 is also supplied to the programming unit 51. The unit 51 is responsive to this pulse to apply to the register 65, via a lead 72 and after a short delay, a pulse signal clearing the register 65. This ensures that the content of the register 65 is positively returned to zero, in preparation for the entry by the customer of the next, second decimal digit of his personal-identification number.

When the customer depresses the push-button 52 appropriate to the second digit of his personal-identification number, the resultant pulse signals on the output leads 61 of the matrix 60 cause entry of the value of this digit into the register 65. In addition, the resultant pulse signal on the lead 62 gives rise to a triggering pulse on both leads 63 and 64. The unit 55 is as a result set to the condition in which its stage I is in the ON state, whereas it is the stage II in the unit 56 that is now set to this state. In these circumstances the signals appearing on the leads 57 are representative of the second decimal digit of the first constituent number read from the card. The value of this digit as temporarily stored and counted down in the register 66, is (by means of the pulses gated to the lead 68) subtracted from the value of digit stored by the register 65. Following this, the programming unit 51 supplies a triggering pulse via the lead 63 to set the unit 55 to the condition in which its stage II is in the ON state, and the value of the second decimal digit of the second constituent number is then, in its turn, subtracted from the content of the register 65. This process is repeated, with the stages III to N of the unit 55 being brought successively to the ON state, to subtract in turn from the content of the register 65 the values of the second digits of the N constituent numbers. The subsequen switching of the stage $(N+1)$ to the ON state in the unit 55, results in a pulse on the lead 69 and this, as before, is passed via the gate 70 to the counter 71 only if the content of the register 65 is then zero. The pulse on the lead 69 also, as before, results in the application to the register 65 via the lead 72 of a clearing signal in preparation for the entry by the customer of the third digit of his personal-identification number.

The operation of the system in response to the entry of the third digit of the personal-identification number and then, in turn, of the fourth to sixth digits, is substantially the same as described above. Upon entry of the relevant digit the unit 55 is reset to the condition in which its stage I is in the ON state, whereas the unit 56 is stepped on to the condition in which the next of its six stages I to VI is in this state. Thus, in response to entry of the fourth to sixth digits in turn, the unit 56 is set successively to select for reading out into the register 66 the values of the digits in the fourth to sixth digital places respectively of the N constituent numbers encoded on the card. While the unit 56 is set to select for reading out the values of the digits in any one of these digital places, the unit 55 is stepped on through the N states in which its stages I to N are successively in the ON state. The values of the digits in the relevant digital place in the N constituent numbers are therefore read out successively into the register 66, and are accordingly subtracted from the content of the register 65. After subtraction of these N values, a pulse on the lead 69 is gated to the counter 71 by the gate 70 only if the content of the register 65 is then zero.

When a pulse appears on the lead 69 following entry of the sixth digit of the personal-identification number, the programming unit 51 supplies to the lead 64 a triggering pulse to switch the stage VII of the unit 56 to the ON state. This switching to the ON state of the stage VII causes a pulse to be supplied via a lead 73 to a gate 74 associated with the counter 71. The gate 74 is responsive to the count of the counter 71 to pass this pulse on to a dispenser-interlock unit 75 only in the event that the count is six. Clearly, the count is six only if the six-digit personal-identification number entered by the customer using the push-buttons 52, is identical to the six-digit personal-identification number encoded on the card in the card reader 17.

The dispenser-interlock unit 75 is operable to supply energization current via a lead 77 to the dispenser 76, so as thereby to release the dispenser 76 to dispense one packet of bank-notes, in response to the pulse passed to the unit 75 by the gate 74. The operation of the unit 75 in this respect is however inhibited while signals are absent from either or both of leads 34 and 78 connected to the unit 75. The lead 34 is the output lead of the code-recognition unit 33 (FIG. 2), and a signal appears on this lead 34 only if the card passed into the card-reader 17 has the magnetic-recordings appropriate to an authentic card. A signal is supplied from the programming unit 51 to the lead 78, on the other hand, only while there is a signal on the lead 50, that is to say, only while the card-reader 17 is closed upon a card. Thus it is only if the following three conditions are all satisfied that the dispenser 76 is released: the card has the magnetic-recordings appropriate to an authentic card; the card-reader 17 is closed upon a card; and the personal-identification number entered manually by the customer is the same as the personal-identification number encoded on the card.

A gate 79 is responsive to the circumstances in which energization current is not supplied to the lead 77 following the pulse on the lead 73, so as to provide a signal on a lead 80 signifying that the three essential conditions have not all been satisfied. The programming unit 51 is responsive to the pulse on the lead 80 to illuminate a third sign (not shown) on the facia 10 (FIG. 2), this sign when illuminated directing the customer to enter again his personal-identification number (although of course the signal on the lead 80 may arise from a cause other than difference between the number entered manually and the personal-identification number encoded on the card). At the same time the programming unit 51 clears the counter 71 to restore the system to the condition existing just prior to the manual entry by the customer of his personal-identification number. (The connection required within the system for initial clearing purposes are not shown in the drawings in the interests of clarity). The system operates in exactly the same manner in response to the second entry of the personal-identification number by the customer, as to the first entry. If as a result of the second entry, the three essential conditions at the unit 75 are still not satisfied, the dispenser 76 is again not released and the customer is again directed to enter his personal-identification number. Satisfaction of the three essential conditions at the unit 75 after either the second or third entry, results in release of the dispenser 76 in the manner described above in relation to the first entry. However, if after the third entry the three conditions are still not all satisfied, the transaction is treated as invalid, the unit 51 responding to three successive pulses on the lead 80 to illuminate a fourth sign (not shown) on the facia 10 (FIG. 2) instead of said third sign. The fourth sign when illuminated indicates to the customer that the transaction is void and that his account will not be debited.

The programming unit 51 is responsive to the circumstances in which either energization current is supplied to the lead 77, or three successive pulses are received on the lead 80, to supply a signal via a lead 81 to reverse the motor 26 and re-engage the clutch 42 (FIG. 2). This signal is applied to the lead 81 by the programming unit 51, and said fourth sign is illuminated, also in the event that the pre-set period of the timer (referred to above) in the unit 51 expires. This latter timer is set in operation by the leading edge of the signal applied to the lead 50, and is pre-set to run for a period adequate to enable manual entry of the personal-identification number three times under direction of the system. The appearance of energization current on the lead 77, or of three successive pulses on the lead 80, before expiry of the pre-set period, automatically terminates operation of this timer.

Referring again to FIG. 2, the application to the lead 81 of the signal that reverses the motor 26 and re-engages the clutch 42, results in drive to the cams 43 and 44 rotating them back to their original angular positions. Accordingly, the roller 29' is lowered to hold the card against the stationary roller 29, and the stop 46 is then raised. The head 38 is raised so as to open the card-reader 17, and the switch 48, instead of the switch 49, is actuated. Actuation of the switch 48 results in the supply of a pulse signal to disengage the clutch 42. This signal is also applied to a timer unit 82 that in response thereto re-engages the clutch 24 for a pre-set period only. Re-engagement of the clutch 24 couples the rollers 27 to 29 to the reversed motor 26 so that these are now rotated in their reverse senses opposite to the arrows F. The card between the rollers 29 and 29' is accordingly withdrawn completely from the card-reader 17. During withdrawal the card is deflected by the spring 35 downwardly through the opening 36 to fall into a suitably-placed bin (not shown) so as to be retained within the system. The card is ultimately retrieved from the system by bank staff both for accounting purposes and re-issue to the appropriate customer. In those circumstances where a packet of bank-notes is not dispensed, that is to say, those circumstances in which for any reason three successive pulses are supplied to the unit 51 via the lead 80 (FIG. 3), or the pre-set period of the timer in the unit 51 runs out, the card is marked to signify this as it is being, or is about to be, withdrawn from the card-reader 17. To this end, an electromagnetically-operated punch (not shown) may be arranged to be energized from the programming unit 51 in either of these circumstances, the punch being located adjacent the stop 46 so as to punch a hole or notch in the card just prior to withdrawal.

When the pre-set period of the timer 82 runs out, a signal to this effect is passed from the timer 82 to the programming unit 51 via a lead 83. The unit 51 in response to this signal acts to prepare the system as a whole (for example, by switching OFF the unit 23 and resetting the unit 33) for reception of another card at the mouth 11.

Provision may be made with the system for storing the personal-identification numbers of the individual cards already presented. In these circumstances, as each new card is presented a search of the stored numbers may be made to discover whether the personal-identification number encoded on the newly-presented card is already stored. Provision may then be made to allow the release of the dispenser only in the event that the number encoded on the card is not already stored more than, say, twice.

Additionally, the signals derived in the system may be used in the provision of automatic accounting and like processes in banking and commerce.

With the form of customer's card described above with reference to FIG. 1, the pulse-recordings carried by the high-coercivity magnetic oxide of the coating 2 are masked by "noise" recorded in the low-coercivity magnetic oxide. Although the use of magnetic-masking in this way provides an element of security it is certainly not an essential. In this latter respect, the coating 2 of the customer's card may consist of high coercivity magnetic oxide alone, the pulse-recordings being recorded in this material and being read by the head 31 in checking the authenticity of the card, as before. Although no masking is used in these circumstances, the magnetic-recording head 30 is preferably retained and energized with alternating current as before, since this ensures that a card cannot satisfy the authenticity-check unless it carries magnetic material of sufficiently high coercivity. This applies whether or not the magnetic material on the card carries pulse recordings that would otherwise satisfy the check, since the action of the head 30 is to erase any recorded signal from material having a coercivity less than the predetermined, high value.

The dispenser for storing and dispensing packets of bank-notes, may have the form illustrated in FIGS. 4 to 15. With this form of dispenser the bank-notes are packed, in prearranged standard amounts, in semi-rigid cartons which are stacked in a column in a suitable container. The cartons are ejected singly from the base of the stack, one in response to each valid "request" by a customer. Each ejected carton is received upon conveyor means whereby it is carried to a delivery point, in particular to a manually-accessible recess where it can be taken out by the customer. The delivery point is spaced from the point of ejection of a carton from the stack, and barrier means is provided between the two points to prevent access to the stack from the delivery point. The conveyor means is arranged to carry the cartons past the barrier means along a path which is of a circuitous nature. In the latter respect, the conveyor means includes two reciprocable trolleys a first of which receives a package from the stack and conveys it in a prearranged first direction to a position displaced from the stack, the package being there transferred to the second trolley. The second trolley is adapted to reciprocate in a different direction (specifically, in a direction perpendicular to that of the first trolley), and during movement by the second trolley the package is acted upon by means which raises it to a higher level, and this makes the package accessible to the customer.

Referring to FIGS. 4 to 15, the dispenser includes a container 501 which is adapted to hold, as a loose fit, a column of the packages of bank-notes stacked one above the other, and which has a hinged rear-wall 502 (FIG. 6) that is held in a closed position by a clip-spring 503. The package-container 501 is mounted on a lower casing 504 that encloses the operating mechanism of the dispenser. The container 501 and the casing 504 are enclosed together in an outer security casing 505 (similar to a safe) having a hinged rear door 506 that is fitted with locking means 507 (FIG. 6).

The front wall of the package-container 501 is provided at its lower end with a slot 508 through which the lowermost package of the stack in the container, can be ejected on a conveyor mechanism in the lower casing 504. The ejection of the lowermost carton-package is effected by a first trolley 509 that constitutes a base in the container 501, and the ejected package is received by a second trolley 510 aligned in front of the slot 508. The trolleys are reciprocated in timed sequence by links that are driven by a cam 511 (FIGS. 8 and 9) in the casing 504, the cam 511 in its turn being driven by an electric motor 512 mounted beneath the casing 504. The energization circuit of the motor 512 is closed by a relay that is energized by the current-signal supplied on the lead 77 (FIG. 3), that is to say, by the signal supplied in response to the correct presentation to the card-reception unit of an authentic card and the manual entry of the correct personal-identification number.

The first trolley 509 is slidable in slots or rails 513 (FIG. 7) in a plate forming the lid of the casing 504, and is connected by a pin-in-slot 514 to one end of a lever 515 that is pivoted by its other end at 516 to a cam plate 517. The lever 515 extends over a bridge 518, and a bolted roller 19 secured to an intermediate point of the lever 515, extends downwards through a slot 520 in the bridge 518 to engage in a slot 521 of the cam 511 (FIG. 8).

In a similar manner the second trolley 510 is reciprocable in slots or rails 522 (FIG. 7 and 10) in an enclosed transverse runway 523 at the front of the dispenser and to one side of the casing 505. The base structure of the trolley 510 makes a pin-and-slot connection 524 with one limb of a cranked lever 525 that is pivoted at its elbow 526 to the cam plate 517. The lever 525 has at the end of its other limb a bolted roller 527 that extends downwards through a slot 528 of the bridge 518 to engage in the slot 521 of the cam 511 at a point spaced from the roller 519.

Figure 11:
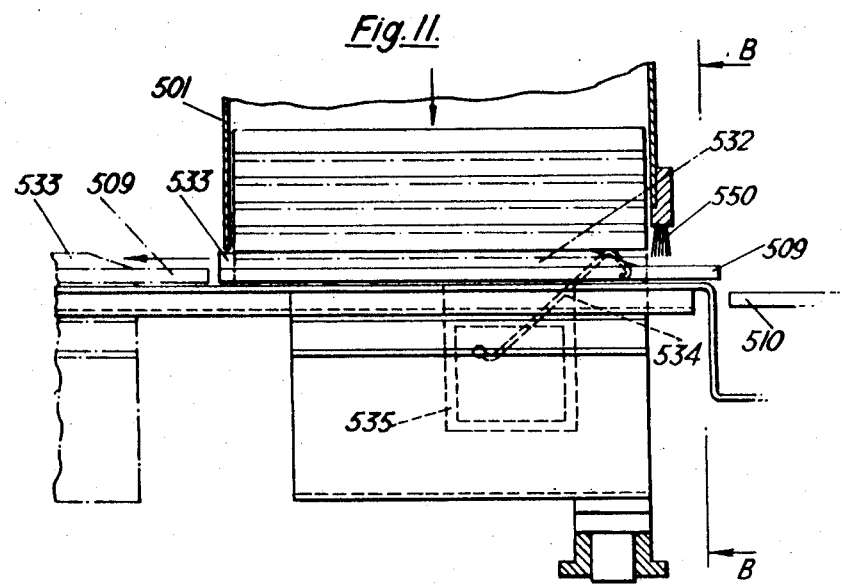
Figure 12:
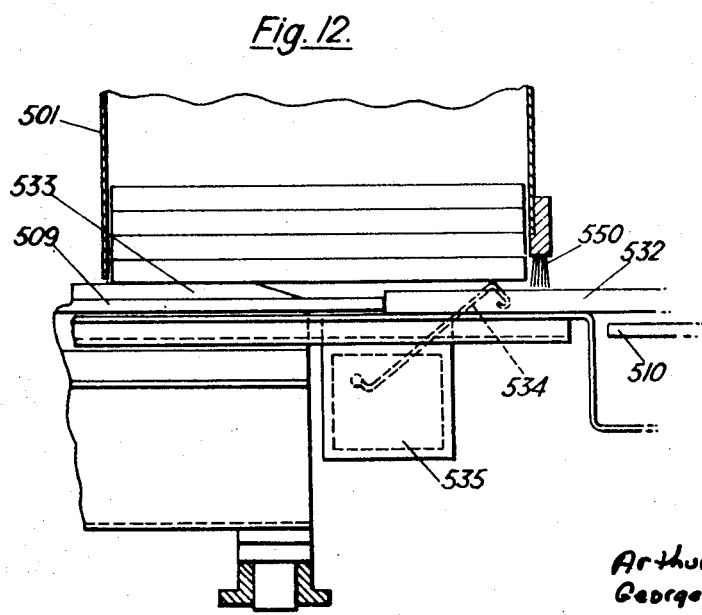

When the cam 511 is set into rotation by the motor 512 it closes a switch 529 by depressing a roller-arm 530. This holds the motor-energization circuit closed until after one complete revolution of the cam 511, a V-slot 531 in its periphery again frees the roller-arm 530 to open the switch 529 and thus break the motor-energization circuit and stop rotation of the motor 512 and cam 511. During this complete revolution of the cam 511, the levers 515 and 525 are swung by the rollers 519 and 527 respectively, in cooperation with the cam-slot 521, the first stage of cam-movement reciprocating the first trolley 509. The trolley 509, which is initially beneath the stack of carton-packages (FIG. 11), is first withdrawn by its lever 515 leftwards as seen in FIG. 11, to the position shown in broken lines. As a result, the stack of carton-packages falls to the floor of the container 501, so that the lowermost carton 532 comes in front of the trolley 509. In consequence, the trolley 509 during its return movement pushes the lowermost carton 532 through the slot 508 of the container 501, in the manner shown in FIG. 12. The second trolley 510 is located just below and in front of the slot 508, and the carton 532 is delivered on to it when the stroke of the first trolley 509 is completed (FIG. 13).

The surface of the first trolley 509 is preferably provided with two or more ribs or rails 533 (ramped or inclined at their forward ends) to reduce the area of contact, and thus reduce the friction, with the undersurface of the stack of cartons when the trolley 509 is reciprocated. The carton-stack bears on the spring arm 534 of a switch 535 to keep it open. When the last carton of the stack is discharged, the arm 534 rises to close the switch 535 and this energizes the EMPTY sign on the facia 10 (FIG. 2) indicating that the container 501 is void of packages, and at the same time breaks supply of the enabling signal to the lead 21 (FIGS. 2 and 3).

The second trolley 510 has a forward low-flange 536 and an upstanding rear-wall 537, between which the carton 532 is delivered. Upon delivery of the carton 532, the second trolley 510 is set into movement by its lever 525 along a horizontal path at right angles to the path of the first trolley 509 (FIG. 7), moving initially rightwards from the full-line position to the broken-line position represented in FIG. 15.

A rectangular aperture in the base of the trolley 510 is occupied by a pivotally-mounted plate 538 that has a boss 539. A rod 540 is carried by bearings underneath the trolley 510 to extend beneath the boss 539 transversely of the direction of movement of the trolley 510. The rod 540, which has opposite ends of square section (FIG. 15), carries a pin 541 that engages in a helical-screw groove 542 in the boss 539.

The length of the rod 540 is less than the distance between the side walls of the runway 523. As the trolley 510 moves from its initial position (full-line in FIG. 10) to the right as seen in FIG. 10, the rod 540 at one end rides against a projecting guide rail 543 (FIG. 10). This moves the rod 540 axially in its bearings towards the inner side-wall of the runway 523, with the result that the pin 541, moving in the screw slot 542, causes the plate 538 to rise about its pivot to an upstanding position, as seen in broken line in FIG. 15. The end of the carton 532 near to the flange 536 of the trolley 510 is thus raised. During this movement the carton is centered on the trolley 510 by guide rails 544 on the inner side-wall of the runway 523.

Over the initial or rest position of the second trolley 510 there is mounted a rigid platform 545 with a ramped or chisel edge 546 located just above the level of the upper edge of the flange 536 of the trolley 510. The end of the carton 532 raised by the plate 538 is above the level of the platform edge 546, and as the trolley 510 returns to its original position, the front of the carton rides over the edge 546 and the carton is in consequence pushed onto the platform 545 by the rear wall 537 of the trolley (as seen in broken lines in FIG. 15). The platform 545 constitutes the base of an apertured recess 547 (FIG. 4), which may have a hinged cover, from which the customer can remove by hand a carton delivered by the trolley 510.

As a guard against jamming, the platform 545 is longitudinally adjustable and, or alternatively, may be formed on its undersurface with a longitudinal slot 548 to accommodate the upper edge of the raised plate 538 (which in this case may extend up above the level of the "chisel" tip of the platform). During the return movement of the trolley 510 the rod 540 rides against a guide rail 549 on the inner side-wall of the runway 523. This displaces the rod 540 axially back to its original position, and thus by reversal of the screw action between the pin 541 and slot 542, folds down the plate 538 to be flush with the base of trolley 510.

Brush-like flexible bristle or wire elements 550 are mounted in the slot 508 to hold down and steady the lowermost carton during ejection from the container 501 as described above.

As a safeguard against improper operation, a pin 551 engages the cam drive. The pin 551 is withdrawn to release the cam 511 for rotation, by a solenoid 552 that is energized by the current supplied from the dispenser-interlock unit 75 (FIG. 3).

The carton-packages used in the dispenser described above are preferably formed of stiff foldable material such as cardboard. A convenient example of carton and a method of its formation from a card blank will now be described with reference to FIGS. 16 to 19.

Referring to FIGS. 16 to 19, the blank is a substantially rectangular sheet of card having at one end a narrow end-flap 553 separated from the body of the blank by two closely-spaced and parallel fold-lines 554. The body of the blank is divided by parallel fold-lines 555 into two halves which are substantially square. The half having the end-flap 553 has opposite side-flaps 556 each with four closely-spaced and parallel fold-lines 557, the outermost of which may be further weakened by perforations, as shown in FIGS. 16 and 17. This part of the body of the blank also has two spaced and parallel transverse slots 558. The front and rear faces of the blank both carry areas of adhesive (preferably of self-sealing variety), as illustrated.

To erect the carton the side-flaps 556 are folded in, the fold-lines 557 allowing each side-flap 556 to be folded into a "tunnel" or "box-girder" type of reinforcement. The outermost edge of each flap 556 adheres to the inner surface of the body of the blank but does not overlap the slots 558 (FIG. 18). The bank-notes to be contained by the carton are folded and inserted to nest between the side reinforcements, and the end-flap 553 is then folded in and over, to be covered by the imperforate half of the blank which is folded in and over at the fold-lines 555. The adhesive areas come together to seal the carton closed in this manner.

The slots 558 allow inspection to make sure that the carton is loaded, and also facilitate tearing to open the carton. It will be noted that a side wall of the carton is formed by the board between the fold-lines 555, and provides an unbroken "edge" to the carton. The cartons are packed into the container 501 with these carton-edges in a position to constitute the leading edge when the carton advances to the chisel-edge 546 of the platform 545, and since this carton-edge is unbroken the risk of jamming or catching on the edge is reduced. Similarly the cartons are preferably packed with the slotted face 558 uppermost so that the imperforate face on the opposite side of the carton rides on to the platform 545. Each carton is provided with an external marking 559 (for example, a blue or other coloured strip) in a selected place at an edge of the carton, in order to facilitate the work of correctly orientating the cartons when these are being stacked into the container 501.

To facilitate erection of the carton there may be provided a shallow rigid tray into which can be fitted the slotted half of the body of the blank. The base of the tray may have rib-like projections to receive the slots 558. When the slotted half of the blank is pressed into this tray the sides of the carton are accurately turned up by the tray-wells, and may then be folded over and sealed as described above. This operation may be carried out by hand, but erection may be by machine.

It should be understood that the invention is not limited solely to the specific details described above; such details may be modified, in order to meet various conditions and requirements encountered, without departing from the scope of the invention.

What is claimed is:

1. Access-control equipment for selectively enabling access to a facility comprising,
   first means for receiving a part at least of a coded token presented to the equipment and for admitting the token further to the equipment only in the event that said part has a predetermined characterstic,
   said characteristic being a characteristic indicative, at least partly, of authenticity of the token,
   second means responsive to any token admitted as aforesaid for reading from the admitted token information encoded thereon,
   third means that is selectively operable to enable access to said facility,
   and fourth means for operating said third means in dependence upon the information read from said token,
   said first means providing an entrance to the equipment for the coded token as presented to the equipment and also including a shutter device for blocking entry of the presented token through said entrance, and
   shutter-control means responsive to said part of the presented token for displacing said shutter device to admit the token through said entrance only in the event that said part of the token has said predetermined characteristic.

2. Access-control equipment according to claim 1 wherein said predetermined characterstic is the existence in said part of the token of holes having a predetermined spatial distribution.

3. Access-control equipment according to claim 2 wherein said shutter-control means includes light-source means, a plurality of spaced light-responsive devices mounted to receive light from said light-source means via said holes of the presented token, the particular combination of light-responsive devices that individually receive this light being dependent upon the spatial distribution of holes in said part of the presented token, and means responsive to the reception of light by only a predetermined combination of said light-responsive devices to displace said shutter device to admit the token through said entrance.

4. Access-control equipment according to claim 4 wherein said second means is spaced from said entrance, and the equipment includes a token-transport arrangement for transporting along a path to said second means any token admitted to the equipment through said entrance.

5. Access-control equipment according to claim 4 including a detector device positioned along said path to detect whether the transported token has a predetermined further characteristic, and means for inhibiting operation of said third means in the event that said further characteristic is not detected by said detector device.

6. Access-control equipment according to claim 5 wherein said detector device is a device for detecting whether the transported token carries magnetic recording.

7. Access-control equipment according to claim 6 including a device positioned along said path at a point in advance of said detector device, for erasing magnetic recording from magnetic material having less than a predetermined coercivity passing that point.

8. Access-control equipment according to claim 1 including,
   a register,
   manually operable means for entering into said register a plural-character word, comparison means for detecting whether a predetermined correspondence exists between the information read from the token and said word entered into said register manually, and means for operating said third means to enable access to said facility only in the event that said predetermined correspondence is detected.

9. Access-control equipment according to claim 8 wherein said manually-operable means includes a set of manually-operable keys.

10. An item-dispensing system including access-control equipment according to claim 1 in combination with dispenser equipment, said dispenser equipment comprising container-means for holding a reserve of items, a delivery station spaced from said container-means, and means responsive to operation of said third means to transfer an item from said container-means to said delivery station.

11. An item-dispensing system according to claim 10 including means responsive to the condition in which the said container-means is empty of said items to inhibit response of said shutter-control means to said part of the presented token.

12. An item-dispensing system comprising,
    means for receiving a part only of a coded token presented to the system and for admitting the remainder of the token to the system only in the event that said part has a predetermined characteristic, said characteristic being a characteristic indicative, at least partly, of authenticity of the token,
    token-reading means for reading from any token admitted as a foresaid information encoded thereon,
    a register,
    means which is operable manually for entering a number into said register, the particular number entered being dependent upon manual selection,
    item-dispensing means which is selectively operable to dispense from a reserve of items at least one such item upon each operation of the item-dispensing means,
    comparison means for comparing a number depenaent upon the information read from the token with said number entered into said register,
    said comparison means including means to operate said item-dispensing means to dispense at least one of said items as aforesaid in dependence upon whether a predetermined correspondence exists between the compared numbers,
    said first means including means providing an entrance to the system for a coded token,
    said token-reading means being spaced from said entrance,
    a token-transport arrangement for transporting to said token-reading means any token admitted fully to the system through said entrance, a shutter device for blocking entry through said entrance of a token presented to the system, means for detecting whether said part of a token presented to the system at said entrance has said predetermined characteristic, and means for displacing said shutter device to admit the token through said entrance only in the event that said predetermined characteristic is detected.

13. An item-dispensing system according to claim 12 wherein said predetermined characteristic is the existence in said part of the token of holes having a predetermined spatial distribution.

14. An item-dispensing system according to claim 12 wherein said item-dispensing means comprises a container for holding a reserve of items, a delivery station spaced from said container, and means that is selectively operable to transfer a single item from said reserve along a predetermined path from said container to said delivery station.

15. An item-dispensing system according to claim 14 wherein said predetermined path is a circuitous path from said container to said delivery station.

16. An item-dispensing system according to claim 14 for dispensing packets of money, said item-dispensing system including a facia that is adapted for mounting in a wall of a bank, and said entrance, manually-operable means and delivery station being provided on said facia to be accessible externally of the bank.

17. Access-control equipment for use with a coded token having a marginal part that has a predetermined characteristic comprising, means defining an external mouth for receiving the token as presented to the equipment with said marginal part leading, switchable token-entry means for controlling entry of said token to the equipment through said mouth, said token-entry means having a first state in which said token-entry means restricts entry of said token through said mouth to said marginal part alone and a second state in which said token-entry means is operative to admit the whole token to said equipment through said mouth, means responsive to entry through said mouth of said marginal part having said predetermined characteristic to switch said token-entry means from its first operative state to its second operative state, token-reading means for receiving said token only when admitted in whole through said mouth, said token-reading means reading from the received token information encoded thereon, and access-enabling means operable in dependence upon the said encoded information read from the token.

References Cited

UNITED STATES PATENTS

| | | | |
|---|---|---|---|
| 2,659,470 | 11/1953 | DuPont. | |
| 3,038,157 | 6/1962 | Simjian. | |
| 3,255,339 | 6/1966 | Rausing | 194—5 X |
| 3,401,830 | 9/1968 | Mathews | 221—2 |

SAMUEL F. COLEMAN, Primary Examiner

Notice of Adverse Decision in Interference

In Interference No. 98,079, involving Patent No. 3,516,527, A. S. Radford, G. T. A. Blakey, G. E. P. Constable, G. E. Cullen and R. Swarbrick, TOKEN CONTROL ACCESS-CONTROL EQUIPMENT AND ITEM-DISPENSING SYSTEMS INCLUDING SUCH EQUIPMENT, final judgment adverse to patentees was rendered Mar. 21, 1974, as to claims 1, 4 and 7.

[*Official Gazette July 4, 1978.*]